United States Patent [19]

Kobata

[11] 4,429,318

[45] Jan. 31, 1984

[54] THERMAL TRANSFER PRINTER

[75] Inventor: Yoshihiro Kobata, Tokyo, Japan

[73] Assignee: Canon Kabushiki Kaisha, Tokyo, Japan

[21] Appl. No.: 366,069

[22] Filed: Apr. 6, 1982

[30] Foreign Application Priority Data

| | | | |
|---|---|---|---|
| Apr. 10, 1981 | [JP] | Japan | 56-54567 |
| Apr. 10, 1981 | [JP] | Japan | 56-54568 |
| Apr. 10, 1981 | [JP] | Japan | 56-54569 |

[51] Int. Cl.[3] .......... G01D 15/10; B41J 29/16

[52] U.S. Cl. .......... 346/76 PH; 400/697.1

[58] Field of Search .......... 400/697, 697.1, 120; 346/76 R, 76 PH

[56] References Cited

U.S. PATENT DOCUMENTS

| | | | |
|---|---|---|---|
| 3,596,055 | 7/1971 | Elston | 219/216 PH |
| 4,108,557 | 8/1978 | Skrzipek et al. | 400/697.1 |
| 4,113,392 | 9/1978 | Ploeger | 400/697 X |
| 4,307,971 | 12/1981 | Kane et al. | 400/697 |
| 4,376,942 | 3/1983 | Toth et al. | 346/76 PH |

FOREIGN PATENT DOCUMENTS

| | | | |
|---|---|---|---|
| 151577 | 11/1981 | Japan | 400/120 |

OTHER PUBLICATIONS

I.B.M. Technical Disclosure Bulletin vol. 16, No. 7, Dec. 1973, p. 2189.

*Primary Examiner*—Donald A. Griffin

*Attorney, Agent, or Firm*—Fitzpatrick, Cella, Harper & Scinto

[57] ABSTRACT

The invention provides a thermal transfer printer wherein printing is performed by reciprocally moving a recording head with heating elements. When a correction instruction is input, the amount of heat generated for printing one character is increased as compared with the amount of heat in normal printing.

8 Claims, 16 Drawing Figures

THERMAL TRANSFER PRINTER

BACKGROUND OF THE INVENTION

1. Field of the Invention

The present invention relates to a printing device which has a function of correcting printed letters with good precision.

2. Description of the Prior Art

In order to correct a letter erroneously printed on a recording paper sheet, an ink of the same color as the recording paper sheet (normally, white) is applied to the letter which is then erased. A conventional correction method of this type will be explained with reference to FIG. 1. Letters, A, B, C, E and E are erroneously printed in a 5×7 dot matrix. The order of letters is supposed to be A, B, C, D and E. The fourth letter E must be corrected to D. For this purpose, all the dots which correspond to the letter E in the 5×7 dot matrix are coated with a white ink, as shown in FIG. 2. The dots which are indicated by cross-hatched lines correspond to erroneously printed letter E, while the dots indicated by hatched lines are coated with the white ink. FIG. 3A is a sectional view of the letter coated with the white ink on the recording paper sheet. The letter D is then printed with a black ink. In this correction method, the erroneously printed letter may not be corrected with high precision. The previously printed letter may be seen through the white ink layer. Especially, if a space is left blank after the letter is erased, that is, if a new letter is not printed thereon, the erroneously printed letter can be seen, resulting in poor appearance. Further, with the correction method of this type, the white ink may not be applied completely to cover the letter due to irregular carriage feeding. This irregular feeding occurs with changes in a drive voltage and deformation of the belt for driving the carriage. As shown in FIG. 3B, when this occurs, the white ink 1 is not properly applied to a letter printed with the black ink 2, resulting in great degradation of printing quality.

SUMMARY OF THE INVENTION

It is an object of the present invention to provide a thermal transfer printer for correcting a printed letter with high precision.

It is another object of the present invention to apply a correction ink to an erroneously printed letter which is then completely erased.

It is still another embodiment of the present invention to apply the correction ink to erase the erroneously printed letter without requiring an increase in the feeding precision of a carriage or the like.

It is still another object of the present invention to apply the correction ink a plurality of times to an erroneously printed letter portion in a short period of time.

DETAILED DESCRIPTION OF THE PREFERRED EMBODIMENTS

Figure 1:
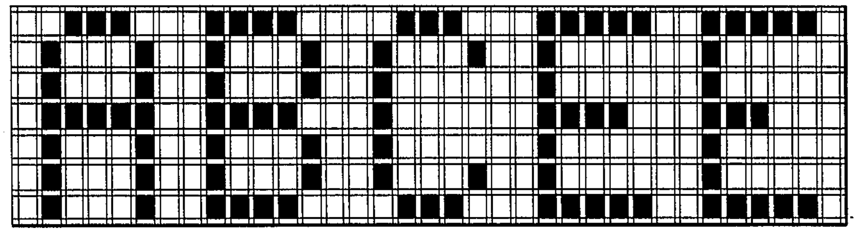
FIG. 1 is a view of a conventional example of printed letters in a 5×7 dot matrix.
Figure 2:
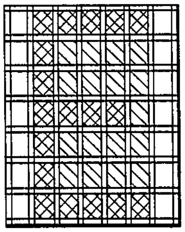
FIG. 2 is a view of a letter to which a correction ink is applied according to a conventional correction method.
Figure 3A:
FIG. 3A is a sectional view of FIG. 2.
Figure 3B:
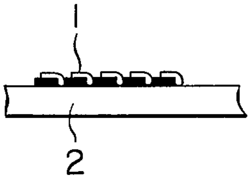
FIG. 3B is a view for explaining a condition in which an erronsously printed letter is not properly coated with a white ink according to the conventional method.
Figure 4:
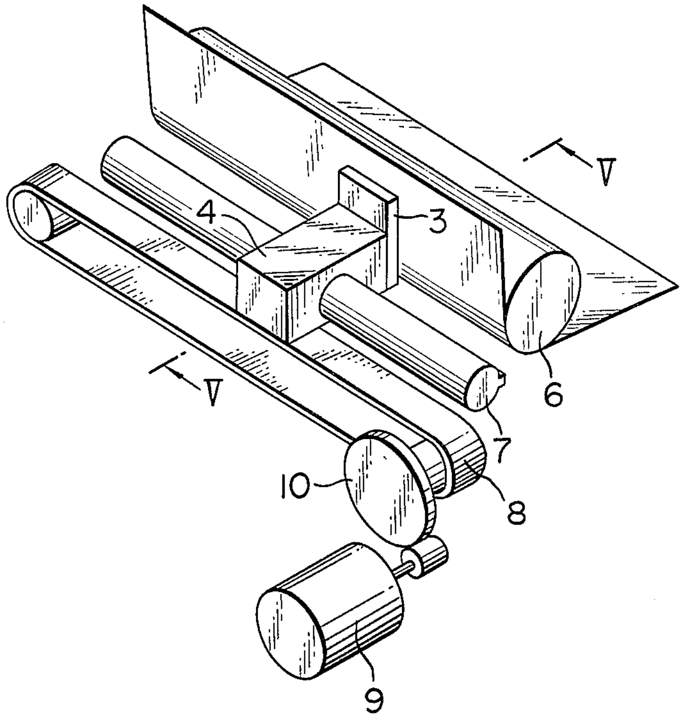
FIG. 4 is a view of a thermal transfer printer which is used in common for embodiments of the present invention.

FIG. 4 schematically shows the arrangement of a thermal transfer printer which is used in common for embodiments of the present invention. A thermal head 3 as a recording head carries heating elements 11 (FIG. 5) on the front surface thereof. The thermal head 3 is fixed on a carriage 4 which partially constitutes a head transfer means. The thermal head 3 is guided by a guide shaft 7 along a recording paper sheet 5 while a black printing ink ribbon 12 and the recording paper sheet 5 are being urged against a platen 6. A belt 8 is fixed on the carriage 4 and transmits the driving force of a space motor 9 to the carriage 4 through a gear 10. The space motor 9 is a source for driving the thermal head 3 and the carriage 4. The gear 10, the belt 8 and the carriage 4 are defined as transfer means. Through this transfer means, the driving force of the motor 9 is transmitted to the thermal head 3 which is then moved horizontally.

Figure 5:
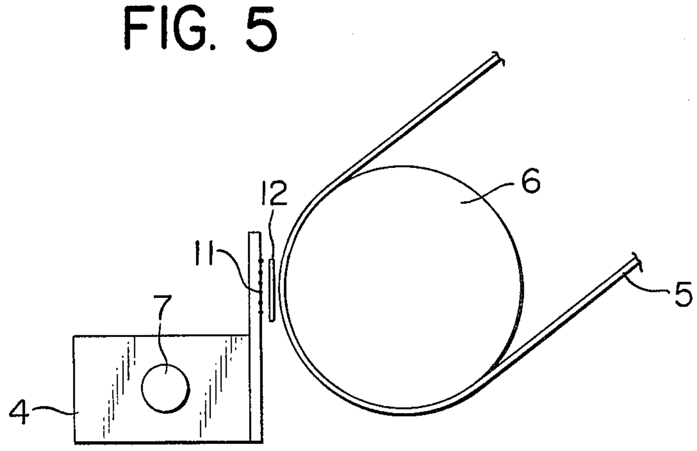
FIG. 5 is a sectional view along the V—V in FIG. 4.

As shown in FIG. 5, the thermal head 3 has seven heating elements 11 which are vertically aligned thereon. Predetermined heating elements among the heating elements 11 are selectively, intermittently driven to melt a black ink on the printing ink ribbon 12 and transfer the melted black ink onto the recording paper sheet 5. More particularly, the black ink consists of a material which can be melted by heat such as a wax and a pigment such as a carbon black. When the black ink is melted, it peels off the base film and is attached to the recording paper sheet 5. While thermal transfer is performed, the thermal head 3 is moved at a constant speed. Therefore, a letter in a matrix form is printed on the recording paper sheet 5.

In order to correct the printed letter, a correction ink ribbon (not shown) is mounted between the heating elements 11 of the thermal head 3 and the recording paper sheet 5 in place of the printing ink ribbon 12. A special thermal head for correction may be arranged in the present invention. In this case, the thermal head for correction is disposed a few characters ahead or behind of the thermal head for printing. The printing ink ribbon is mounted for the thermal head for printing and the correction ink ribbon is mounted for the thermal head for correction.

Figure 6:
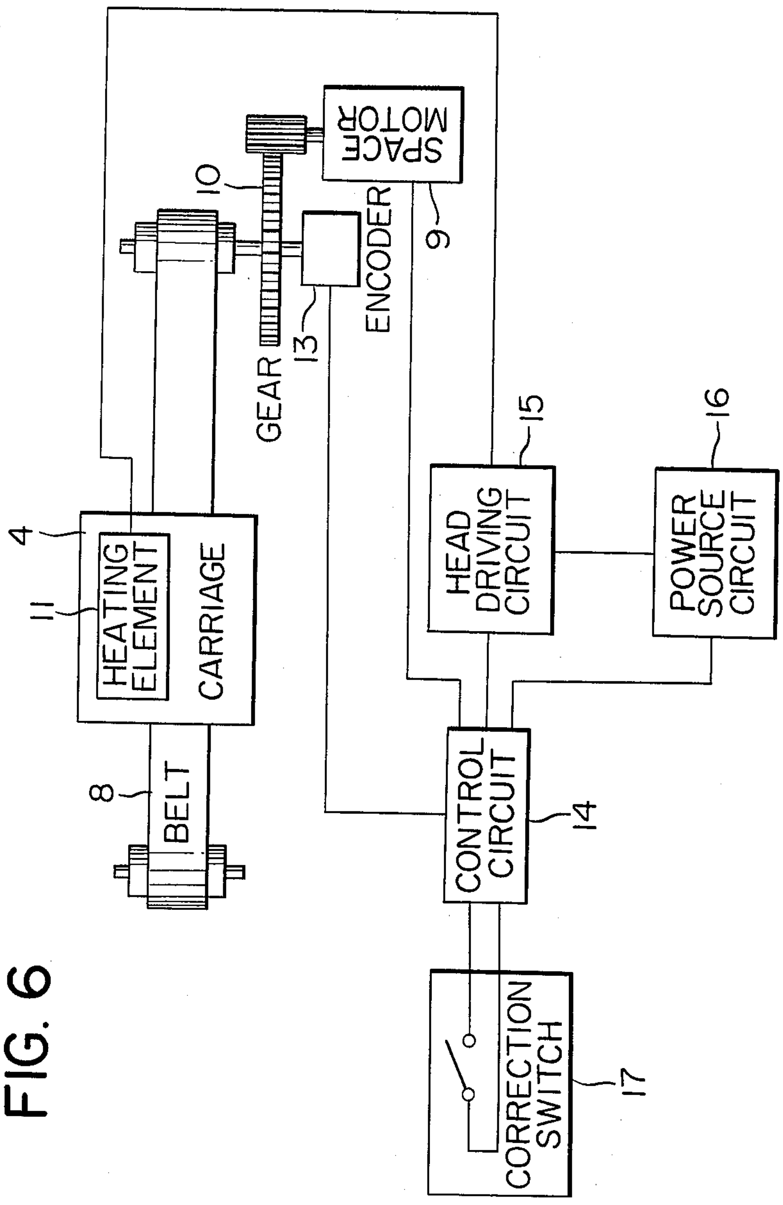
FIG. 6 is a block diagram of the thermal transfer printer according to one embodiment of the present invention.

A block diagram shown in FIG. 6 is commonly used for embodiments of the present invention. An encoder 13 is defined as a position detecting means for detecting the angular position of the gear 10, that is, the position of the thermal head 3. Upon rotation of the space motor 9, pulses are generated in correspondence with dots or characters by the encoder 13. In response to the output pulse from the encoder 13, a control circuit 14 as a central control means performs the overall control of the printer such as timing control for driving the heating elements 11, rotation control of the space motor 9, feeding control of the printing ink ribbon 12, and feeding control of a recording paper sheet. The control circuit 14 then permits printing of data such as numbers and characters entered through a keyboard (not shown) or data input means. Further, the control circuit 14 receives from a correction switch 17 an instruction for correction of the erroneously printed letter, and controls the space motor 9 and a head driving means which consists of a head driving circuit 15 for turning on/off the heating elements 11 and of a power source circuit 16 for applying a plurality of voltages to the heating elements 11 so that letters can be printed on the recording paper sheet. In order to correct the erroneously printed letter, the control circuit 14 controls the head driving means to increase the amount of heat generated from the heating elements for one character in such a manner that the correction ink on the correction ink ribbon is applied to the erroneously printed letter to a thickness which is greater than the thickness in normal printing or the correction ink overlaps the erroneously printed letter.

Figure 7A:
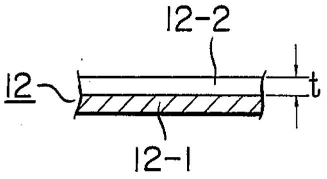
FIG. 7A is a side view of a printing ink ribbon.
Figure 7B:
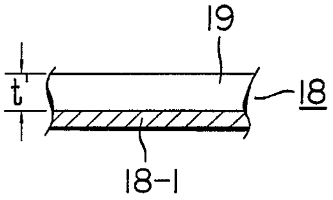
FIG. 7B is a side view of a correction ink ribbon.
Figure 8:
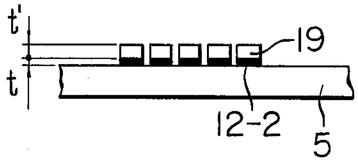
FIG. 8 is a side view of an example of letter correction according to a first control method.

Control methods of the control circuit 14 at the time of correction of an erroneously printed letter will be described in detail. In a first control method, the carriage 4 is moved to a character to be corrected and the correction ink ribbon is mounted instead of the printing ink ribbon 12. The correction switch 17 is then turned on. When the control circuit 14 detects that the correction switch 17 is turned on, the control circuit 14 allows the power source circuit 16 to generate a voltage to a temperature higher than the voltage at the time of printing. Accordingly, the space motor 9 is driven to drive all the dots of the heating elements 11 which are heated to a temperature higher than a temperature at the time of printing. A thickness t′ of a correction ink layer 19 of a correction ink ribbon 18 shown in FIG. 7B is greater than a thickness t of an ink layer 12-2 of the printing ink ribbon 12 shown in FIG. 7A. The thicker correction ink layer is melted completely by the heat generated by the heating elements 11. As shown in FIG. 8, the correction ink layer 19 is formed on the ink layer 11 of the erroneously printed letter. Therefore, the erroneously printed letter cannot be seen through the correction ink layer 19.

Figure 9:
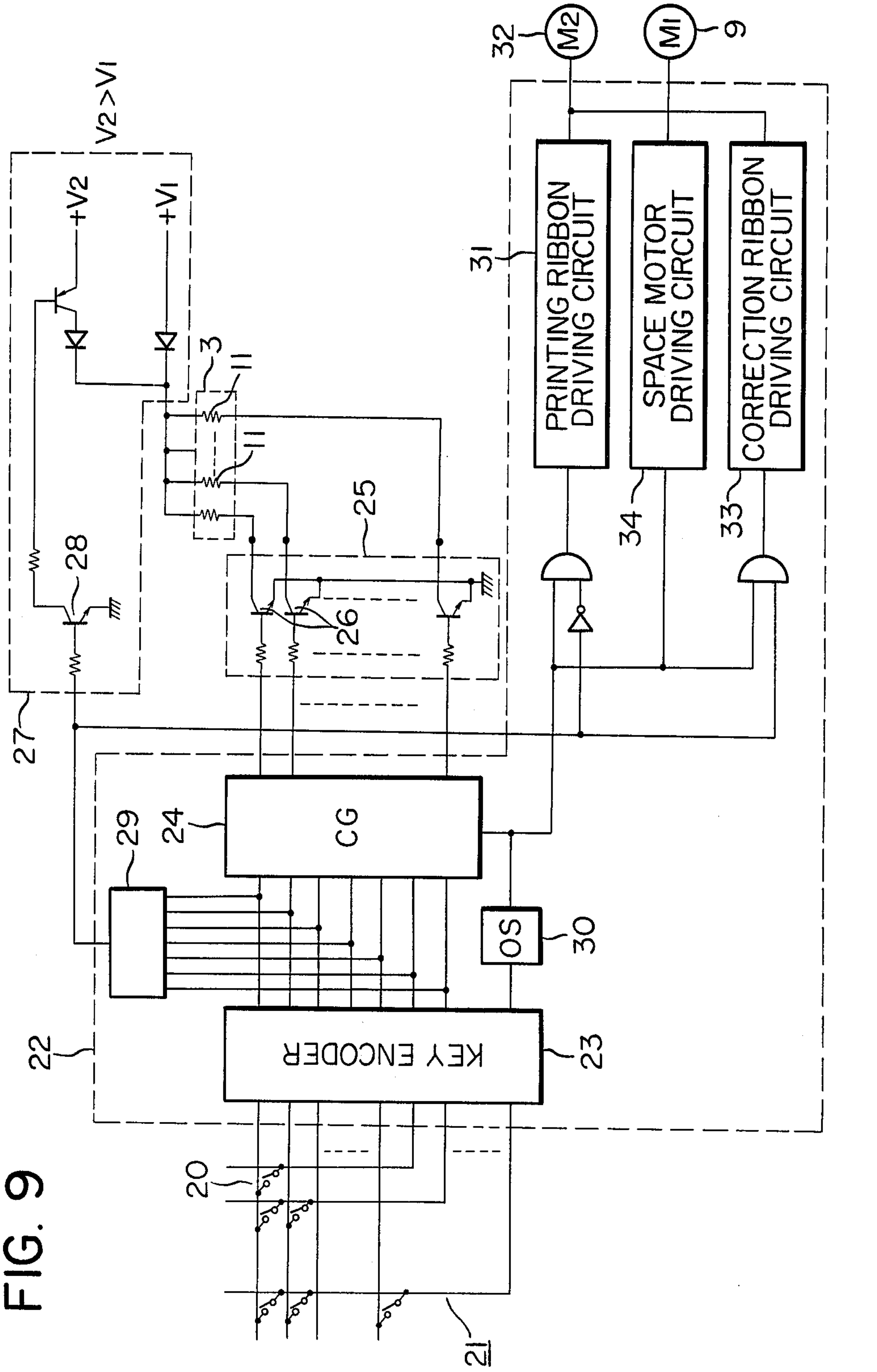
FIG. 9 is a block diagram of a circuit suitable for the first control method.

FIG. 9 is a detailed block diagram of the control circuit suitable for the first control method. Letters and numbers which are entered by a keyboard 21 as a data input means including a correction key (switch) 20 are coded by a key encoder 23 in a control circuit 22 for controlling the overall operation of the printer. Each coded signal is supplied as a heating element selection signal to a head driving circuit 25 through a character generator 24. The head driving circuit 25 comprises switching transistors 26 which number the same as the heating elements 11 and which serves as the switching means for the heating elements 11. A power source circuit 27 supplies power to the heating elements 11 which are then driven. The power source circuit 27 generates two voltages $V_1$ and $V_2$ which are selectively applied to the heating elements 11. More particularly, when the correction key 20 is depressed, a correction key detector 29 generates a signal of level "1" which is supplied to the base of a switching transistor 28. That is, when the correction key 20 is depressed, the voltage $V_2$ is applied to the heating elements by the power source circuit 27. However, if the correction key 20 is not depressed, the voltage $V_1$ lower than the voltage $V_2$ is applied to the heating elements 11. A one-shot multivibrator 30 functions as a timer means and produces a signal of level "1" for a predetermined period of time when one of the keys on the keyboard 21 is depressed. An output of level "0" from the correction key detector 29 is inverted by an inverter and supplied to an AND gate. Only when the AND gate receives an output of level "1" from the one-shot multivibrator 30, a signal of level "1" is thus supplied to a printing ribbon driving circuit 31 to drive a ribbon take-up motor 32 to wind the printing ink ribbon 12. When one of the keys which are used to enter data such as letters and numbers, except for the correction key 20, is depressed, the driving circuit 31 drives the ribbon take-up motor 32 for a predetermined period of time to drive the printing ink ribbon for one character. A correction ink ribbon driving circuit 33 drives the ribbon take-up motor 32 for a predetermined period of time while the signal of level "1" is being supplied from an AND gate which receives the output from the correction key detector 29 and an output from the one-shot multivibrator 30. The correction ink ribbon is then fed for a predetermined length. That is, when the correction key 20 is depressed, the driving circuit 33 drives the motor 32 for a predetermined period of time to wind the correction ink ribbon for one character. A space motor driving circuit 34 is operated only when the one-shot multivibrator 30 is set to high level and the signal of level "1" is supplied thereto. The carriage 4 and the thermal head 3 are shifted by one character toward the printing direction. The duration in which the one-shot multivibrator 30 is set to level "1" is preferably synchronous with a duration for printing one character.

Figure 10:
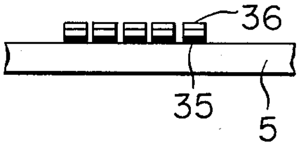
FIG. 10 is a side view of an example of letter correction according to a second control method.

A second control method of the control circuit 14 at the time of correction of the erroneously printed letter will be described. In the same manner as in the first control method, the carriage 4 is aligned and the printing ink ribbon is replaced by the correction ink ribbon. The correction switch 17 is then depressed. The control circuit 14 drives the carriage 4 reciprocally to form two ink layers on the erroneously printed letter. As shown in FIG. 10, two white ink layers 36 are formed on a black ink layer 35. Two or more white ink layers may be formed on the black ink layer 35. The correction ink layers cover the ink layer (black) completely.

Figure 11:
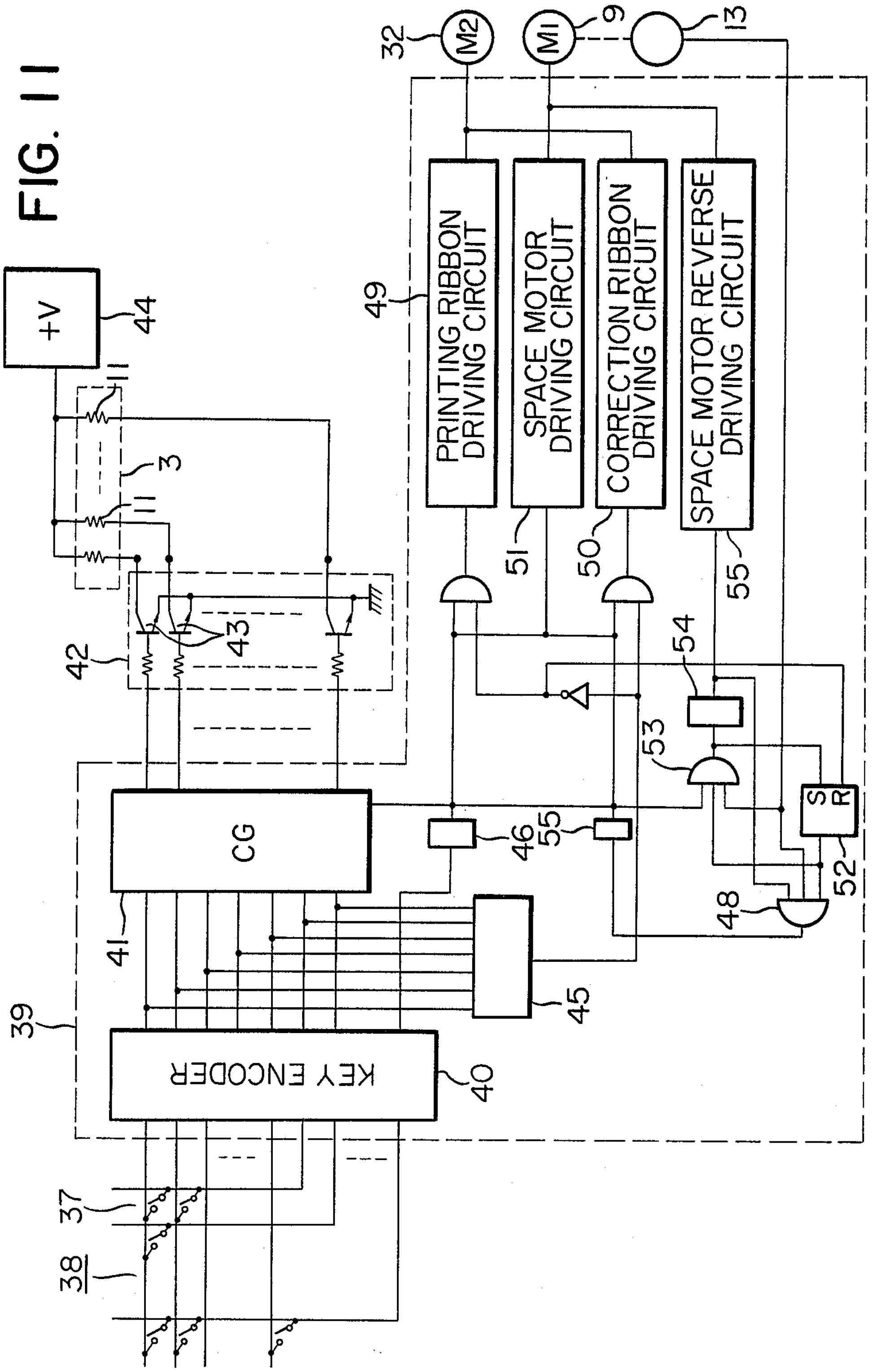
FIG. 11 is a block diagram of a circuit suitable for the second control method.

FIG. 11 is a detailed block diagram of a control circuit suitable for the second control method.

Letters and numbers entered by a keyboard 38 as a data input means including a correction key 37 are coded by a key encoder 40 in a control circuit 39 for controlling the overall operation of the printer. Each coded signal is supplied as a heating element selection signal to a head driving circuit 42 through a character generator 41. The signal is generated by the character generator 41 when a one-shot multivibrator 46 is set to level "1". The head driving circuit 42 comprises switching transistors 43 which number the same as the heating elements 11. A power source circuit 44 supplies power to the heating elements 11. A detector 45 generates a signal of level "1" which indicates depression of the correction key 37 when the correction key 37 is depressed. A one-shot multivibrator 46 as a timer means receives an OR signal (generated when one of the keys is depressed) from the keyboard 37 and generates a signal of level "1" for a predetermined period of time. An output of level "0" from the correction key detector 45 is inverted by an inverter and supplied to an AND gate. Only when the AND gate receives an output of level "1" from the one-shot multivibrator 46, a signal of level "1" is thus supplied to a printing ribbon driving circuit 49 to drive a ribbon take-up motor 32 to wind the printing ink ribbon 12. When one of the keys which are used to enter data such as letters and numbers, except for the correction key 37, is depressed, the driving circuit 49 drives the ribbon take-up motor 32 for a predetermined period of time to drive the printing ink ribbon for one character. A correction ink ribbon driving circuit 50 drives the ribbon take-up motor 32 for a predetermined period of time while the signal of level "1" is being supplied from an AND gate which receives the output from the correction key detector 45 and an output from the one-shot multivibrator 46. The correction ink ribbon is then fed for a predetermined length corresponding to one character for a predetermined period of time. That is, when the correction key 37 is depressed, the driving circuit 50 drives the motor 32 for a predetermined period of time to wind the correction ink ribbon for one character. A space motor forward driving circuit 51 is operated only when the one-shot multivibrator 46 is set to level "1". The carriage 4 and the thermal head 3 are shifted by one character toward the printing direction. The duration in which the one-shot multivibrator 30 is set to level "1" is preferably synchronous with a duration for printing one character. An RS flip-flop 52 is reset when keys except for the correction key 37 are depressed. When the correction switch 37 is depressed, however, the printing ink ribbon driving circuit 49 and the space motor driving circuit 51 drive the motors 32 and 9, respectively, for a predetermined period of time. All the dots of the heating elements 11 are intermittently driven and a first correction ink layer is formed on the erroneously printed letter. When the carriage 4 is shifted in the forward direction by one character, the encoder 13 generates a pulse. Thus, a signal of level "1" is produced from an AND gate 53. A one-shot multivibrator 54 has a smaller time constant than that of the one-shot multivibrator 46 and generates a signal of level "1" for a predetermined period of time. A space motor reverse driving circuit 55 drives the motor 9 in the reverse direction only when the signal of level "1" is generated by the one-shot multivibrator 54. The carriage 4 is then shifted in the reverse direction by one character. A detector 13 which has a slightly smaller time constant than that of the one-shot multivibrator 46 does not produce a pulse. Therefore, the carriage 4 may not be fed in the forward direction again. When the carriage 4 is shifted by one character in the forward direction and the detector 13 generates the pulse, a signal of level "1" is supplied from the AND circuit 48 to a one-shot multivibrator 56 the time constant of which is the same as that of the one-shot multivibrator 54. The one-shot multivibrator 56 is then set to level "1". Therefore, even if the carriage 4 is shifted in the reverse direction, a pulse for driving all the dots of the heating elements 11 is generated by the character generator 41. The correction ink ribbon is also fed for a length corresponding to one character. The two correction ink layers are formed by reciprocal movement of the carriage 4.

Figure 12:
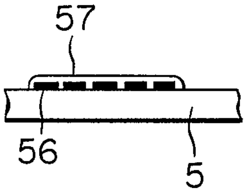
FIG. 12 is a side view of an example of letter correction according to a third control method.

A third control method of a control circuit at the time of correction of erroneously printed letter correction will be described. In the same manner as in the first and second control methods, the carriage 4 is aligned and the printing ink ribbon is replaced with the correction ink ribbon. The correction switch 17 is the depressed. The control circuit 14 detects the key-in signal and controls a switching circuit 15. The heating elements 11 are driven while the thermal head 3 is being fed. As shown in FIG. 12, the surfaces of black dots 56 and spaces between dots are coated with a white ink 57. Therefore, independently of the feeding precision of the carriage 4, the erroneously printed letter is completely coated with the white ink. This space may be blanked or a new character may be printed thereon with high quality.

Figure 13:
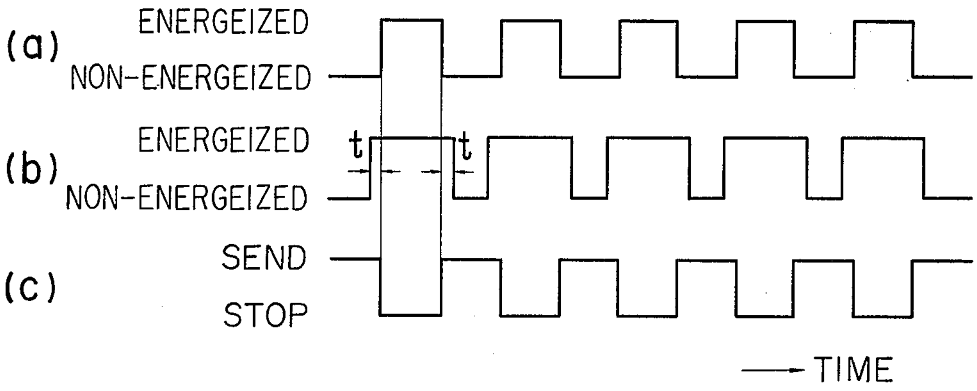
FIG. 13 shows timing charts of signals in the third control method.

FIG. 13 shows timing charts for explaining feeding of the thermal head and driving timing of the heating elements 11. As indicated by a waveform (c), the thermal head 3 is intermittently driven in printing. The heating elements 11 are energized as indicated by a waveform (a). At the time of erroneously printed letter correction, although the thermal head 3 is fed intermittently as indicated by the waveform (c), the heating elements 11 are energized in such a manner that the leading edge of the signal with a waveform (b) is ahead of the trailing edge of the signal with the waveform (c) by time t and the trailing edge of the signal with the waveform (b) is delayed by time t from the leading edge of the signal with the waveform (c).

Figure 14:
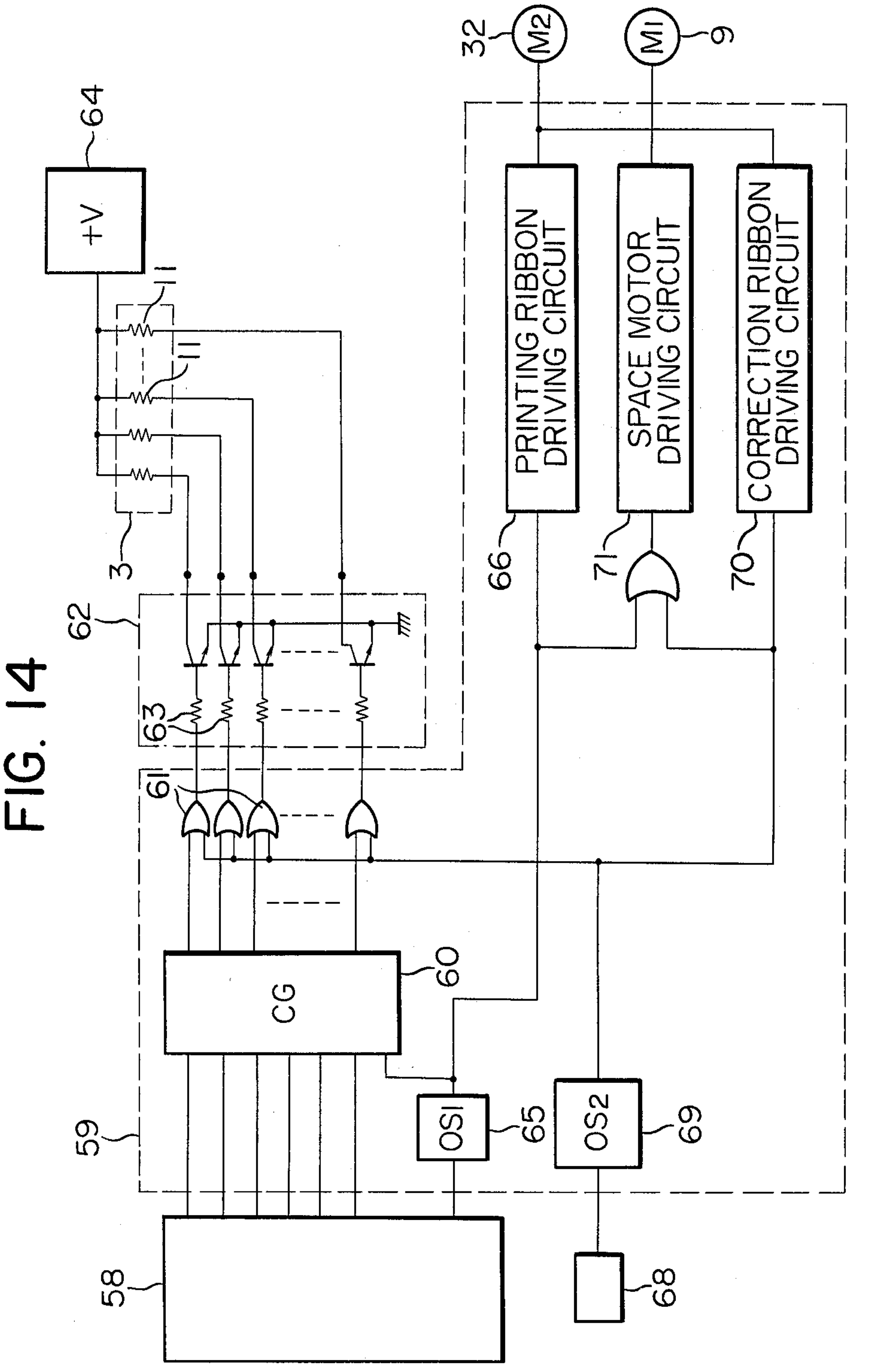
FIG. 14 is a block diagram of a circuit suitable for the third control method.

FIG. 14 is a block diagram of a circuit suitable for the third control method. Letters and numbers entered by a keyboard unit 58 as a data input means are coded. Each coded signal is supplied to a character generator 60 of a control circuit 59 for controlling the overall operation of the printer. The coded signal is then supplied as a selection signal to a head driving circuit 62 through an OR gate 61. A head driving circuit 62 comprises switching transistors 63 which number the same as the heating elements 11. A power source circuit 64 as a power source means supplies power to the heating elements 11. A one-shot multivibrator 65 generates a signal of level "1" for a predetermined period of time when one of the keys of the keyboard unit 58 is depressed. A printing ribbon driving circuit 66 drives the ribbon take-up motor 32 while a one-shot multivibrator 65 is set to level "1". When one of the keys for entering data such as letters and numbers, except for the correction key 20 is depressed, the driving circuit 66 drives the motor 32 for a predetermined period of time and the printing ink ribbon is driven for a length corresponding to one character. A correction switch 68 is used to instruct correction of the erroneously printed letter. When it is depressed, a one-shot multivibrator 69, the time constant of which is greater than that of the one-shot multivibrator 65, generates a signal of level "1" for a predetermined period of time.

A correction ribbon driving circuit 70 receives the output of high level from the one-shot multivibrator 69 to drive the motor 32 for a predetermined period of time. When the correction switch 68 is depressed, the driving circuit 70 drives the motor 32 to wind the correction ink ribbon for a length corresponding to one character in a predetermined period of time. A space motor driving circuit 71 drives the space motor 9 for a period in which the one-shot multivibrator 65 or 69 is set to high level. The carriage 4 and the thermal head 3 are shifted by a space corresponding to one character in the printing direction. The duration in which the one-shot multivibrator 65 is set to level "1" is preferably the same as a duration for printing one character.

In the above embodiment, when the correction switch 68 is depressed, the one-shot multivibrator 69 is set to level "1" and the space motor 9 and the ribbon take-up motor 32 are driven. Therefore, the carriage 4 and the thermal head 3 are moved for a length corresponding to one character along the printing direction, and the correction ribbon is wound for a length corresponding to one character. All the transistors of the driving circuit 62 are kept ON. The heating elements 11 are heated until the erroneously printed letter is corrected.

The present invention is not limited to the particular embodiments described above. For example, in the embodiment described above, the heating elements of the 1×7 dot matrix are used and a character with the 5×7 dot matrix is printed by driving the thermal head. However, a thermal head in which heating elements are arranged in the 5×7 dot matrix form may alternatively be used. Further, the present invention may be applied to parallel printing, using a full-multiple head.

What I claim is:

1. A thermal transfer printer, comprising:

a thermal head having heating elements;

means for inputting a correction instruction;

means for supplying power to said heating elements and for driving said heating elements; and controlling means for controlling power supplied to said heating elements by said driving means to increase an amount of heat generated by said heating elements when the correction instruction for one character is supplied to said controlling means by said correction instruction inputting means.

2. A thermal transfer printer according to claim 1, wherein said controlling means boosts a voltage applied to said heating elements when the correction instruction is input by said correction instruction inputting means.

3. A thermal transfer printer according to claim 2, wherein said driving means includes power source means for supplying power to said heating elements under the control of said controlling means, and head driving means for controlling on/off operation of said heating elements.

4. A thermal transfer printer according to claim 1, wherein said controlling means controls said driving means to heat said heating elements for printing a plurality of characters when the correction instruction is input by said correction instruction inputting means.

5. A thermal transfer printer according to claim 1, wherein said controlling means controls said driving means to elongate a duration of energization of said heating elements when the correction instruction is input by said correction instruction inputting means.

6. A thermal transfer printer according to claim 5, wherein said controlling means includes timer means for controlling said driving means to supply power for a predetermined period of time after the correction instruction is input by said correction instruction inputting means.

7. A thermal transfer printer, comprising:

inputting means having a correction switch;

detecting means for detecting that said correction switch is turned on;

power source outputting means for outputting a first output voltage when said correction switch is turned off, and for outputting a second voltage higher than the first voltage when said detecting means detects that said correction switch is turned on; and a recording head, heated by power supplied from said power outputting means, for melting ink of an ink ribbon.

8. A printer, comprising:

moving means for moving a correction head along a recording paper sheet;

data inputting means having a correction inputting switch;

detecting means for detecting that said correction inputting switch is turned on;

first driving means for controlling said moving means to move said correction head in a first direction along the recording paper sheet when said detecting means detects that said correction inputting switch is turned on;

position detecting means for detecting movement, in the first direction of said correction head for a predetermined length in accordance with a detection result from said detecting means; and second driving means for controlling said moving means to move said correction head in a second direction opposite to the first direction when said position detecting means detects movement of said correction head.

* * * * *